March 18, 1958     A. MAAG     2,827,344

BEARING SEALS

Filed Sept. 21, 1954

INVENTOR:
ALBERT MAAG
BY:

United States Patent Office 2,827,344
Patented Mar. 18, 1958

2,827,344

BEARING SEALS

Albert Maag, Dietikon, near Zurich, Switzerland, assignor to Meyer & Co., Zurich, Switzerland, a firm of Switzerland Application September 21, 1954, Serial No. 457,357

11 Claims. (Cl. 308—187.1)

The present invention relates to improvements in sealing means for bearings, and it is the primary object of the invention to provide novel means for sealing the bearings of pulleys, idlers, or any other machinery against the entry of moisture, dust or other foreign matter.

Idlers and similar wheels used in various branches of industry, for example, for supporting and guiding conveyor belts, are often strongly exposed to dust and moisture which will attempt to penetrate into the bearings. Apart from the fact that this will gradually lead to destruction of the bearings, such foreign matter therein will increase the friction of the bearings and exert a braking action upon the idlers, and, in extreme cases, may block the rotation thereof entirely. If the idlers or wheels are used in cold climates and are especially exposed to moisture, such moisture penetrating into the bearings is liable to freeze at times when the conveyor is standing still, for example, at night, thus blocking the rotation entirely and requiring time-wasting thawing operations before the conveyor can again be driven.

Since up to the present time no particular attention was paid to effective sealing of the roller bearings supporting the idlers of conveyor belts, it was necessary to keep them adequately supplied with grease by adding new grease at frequent intervals. For this purpose a grease gun was applied at regular intervals to a grease nipple provided either on a rotating or stationary part, and the grease forced through the bearing until it exuded from the unsealed edges thereof. This is still the common practice today for assuring, for example, that the bearings of automobiles are adequately supplied with grease. Such frequent greasing was necessary to replenish the grease which during the rotation had been lost through the poorly sealed discharge points on the bearing or its housing, as well as to flush out any foreign matter which had entered the bearing.

It has now been found that the proper lubricating action of the grease once inserted into the bearing will last for a great length of time, possibly even for the length of the life of the respective machine, if the bearing is adequately sealed toward the outside to prevent any water, dust, or other foreign matter from penetrating into the bearing and if the grease subsequently supplied is used less for the purpose of lubricating the bearing, rather than for sealing the bearing toward the outside against the entry of any contamination.

Consequently, it is an object of the present invention to devise a new bearing structure in which sealing means are provided to prevent the penetration of any foreign matter toward the inside of the bearing, and in which the lubricating grease is utilized to improve the action of such sealing means, as well as to lock the grease within the bearing so that it may more effectively carry out the function for which it is intended, namely to lubricate the movable parts of the bearing.

One of the features of the invention for carrying out this object resides in the provision of a combination of narrow labyrinth passages with resilient sealing means which, when pressure is exerted upon them from the inside by grease being pumped against them by means of a grease gun, will open sufficiently to allow the grease to pass into the labyrinth passages to eject the old and contaminated grease and then to build up a new clean oil seal; which resilient means, however, when subjected to any pressure from the outside, i. e. through such labyrinth passages, will seal the entry to the bearing still more effectively.

Another feature of the invention resides in the provision of a conical, metallic element which is designed and shaped so as to direct most of the grease injected by a grease pump toward the sealing passages so as to flush them out and replenish them with new sealing grease, and to permit only a minor part of the newly injected grease, if any, to enter the bearing proper.

Still another feature of the invention resides in a combination and interaction of walls mounted on stationary and rotary parts of the respective machine or apparatus so as to form intermediate labyrinth passages acting both as collectors of foreign matter attempting to enter the bearing, as well as containers of a sealing medium, preferably grease.

These, as well as other objects, features, and advantages of the present invention will be apparent from the following detailed description and the accompanying drawings describing and showing the invention as applied to idlers as used for supporting and guiding conveyor belts, it being understood, however, that such particular embodiments of the invention are not to be regarded as constituting any sort of limitation thereof but purely as an example of one of the many forms of application of the invention in various types of devices or machines.

In the drawings—

Fig. 2 shows a similar section of a modification of the invention, showing the right side of an idler as illustrated in Fig. 1; while Fig. 3 is a section through a sealing element according to the invention which is designed to form a separate unit.

Figure 1:
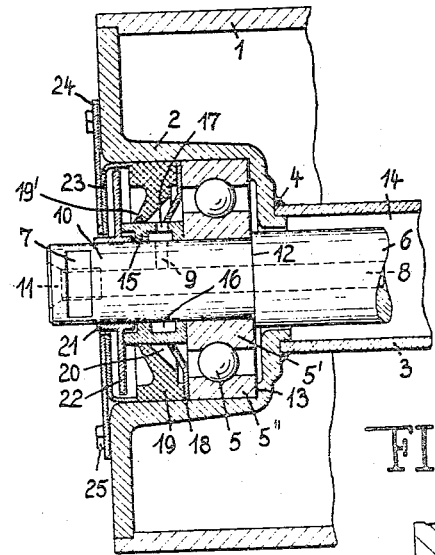
Fig. 1 shows a cross section through the left side of a conveyor idler with the bearing and sealing structure according to the invention.

Referring particularly to Fig. 1 of the drawings, the hollow cylinder 1 forming the belt-supporting surface of an idler is completely closed at each end by a socketlike or pot-shaped part 2 which is rigidly secured to the roller 1 either by being threaded therein or by being welded thereto. The inner end of each socket 2 terminates in a suitable flange 4 to which a tubular member 3 is rigidly secured, for example, by welding, or by being threaded thereon, the tubular member 3 thus combining the two sockets 2 with the roller 1 to form a single unit.

The idler 1, 2, 3 is rotatably supported on the stationary shaft 6 by means of a roller bearing 5 mounted at or near the bottom of each of the sockets 2. Near its ends the shaft 6 is preferably provided with parallel surfaces 7 for mounting it securely between a pair of bearing brackets or the like which are not shown in the drawing as they do not form a part of the invention. Shaft 6 has an axial bore 8 extending throughout the shaft and at least one bore 9 near each end and transversally to bore 8, and extending from bore 8 radially to the peripheral surface of the reduced ends or necks 10 of shaft 6. At least one end of bore 8 is closed by a screw plug 11 or a grease nipple, the other end either being closed entirely or likewise by a similar plug or nipple.

As shown in Fig. 1, the inner race 5' of the bearing 5 abuts against a shoulder 12 on shaft 6, and the outer race 5" against a shoulder 13 near the bottom of the socket 2. The relative dimensions of the socket 2 and the shaft 6 are thus that the central aperture 13' in the bottom of socket 2 is of slightly larger diameter than shaft 6 so as to permit any excess of grease from passing from the bearing 5 to the annular chamber 14 between shaft 6 and the tubular member 3, such chamber thus forming a reservoir for the supply of lubricant to both bearings.

After fitting the bearing 5 into the socket 2, a ring 15 is placed upon the reduced neck 10 of shaft 6 so as to fit tightly thereon. Ring 15 has an inner annular groove 16 and at least one aperture 17 extending from groove 16 to the outer surface of ring 15. As shown in the drawing, groove 16 is so positioned relative to the radial bore 9 that the grease supplied through the axial bore 8 may be forced through bore 9 into groove 16 and thence through the aperture 17 into the space in front of the bearing 5.

Further, a washer 18 which, near its central aperture is of conical shape, is inserted into the socket 2 so that its flat outer portion abuts against the outer race 5″ of the bearing 5 and its conical portion is directed toward the respective outer end of shaft 6. The central aperture of washer 18 is only slightly larger than the outer diameter of ring 15, and the conical part of washer 18 is shaped so that the inner annular surface thereof, i. e. the wall of the aperture in washer 18, will not cover the aperture 17 or only a very small portion thereof.

Next, a resilient gasket 19, preferably of rubber or similar material, is inserted into the socket 2. Toward its central aperture, this gasket 19 is made of conical shape with the conical part extending toward the respective shaft end, preferably so that its cross sectional thickness gradually reduces toward the truncated end of the cone. Thus, an annular chamber 20 of angular cross section is formed between the conical parts of washer 18 and gasket 19, and such chamber is closed toward the outside by the inner wall of the gasket aperture pressing tightly against the outer surface of ring 15. Gasket 19 as well as the grease in chamber 20 inserted therein through the aperture 17, individually as well as combined, seal the bearing 5 toward the outside so as to prevent any water, dust, or other foreign matter from reaching the bearing 5, and also effectively lock the grease within the channels and chambers of the bearing and the sealing structure.

The conical shape of washer 18 as above-described acts as a reinforcement thereof, guides the grease when injected under pressure through aperture 17 to slide outwardly so as to fill out chamber 20 completely before it may ooze into the bearing 5, and prevents the washer which rotates with the upper race 5″ of the bearing from being bent under the pressure in chamber 20 toward the stationary race 5′. Such bending would force the rotating washer 18 into contact with the stationary race 5′ and also close the narrow grease passage to bearing 5 entirely.

For additional protection and sealing, a disklike washer 22 having a hub 21 is fitted tightly upon the neck 10 of shaft 6, and the entire socket is closed toward the outside by a cupped washer 23 which tightly fits into the outer end of socket 2 and flat outer surface of the socket 2 by bolts 25.

When grease is forced into the bore 8, it will pass through bore 9 into groove 16, thence through aperture 17 into chamber 20. Since the slot between washer 18 and the cylindrical surface of ring 15 is rather narrow, the grease will pass to bearing 5 only with difficulty, thus primarily filling up chamber 20 and building up a pressure therein which will tend to bend the weakest portion of gasket 19, i. e. the portion 19′ adjacent and normally in sealing contact with ring 15, toward the outside, thereby permitting the grease to be forced into the chamber 50 and thence over and around the washer 22 into the narrow chamber outwardly bordered by the washer 23, and finally to the outside through the narrow annular slot intermediate the hub 21 and the inner edge of cover 24. The labyrinthlike passage around washer 22 being filled with grease, the centrifugal force exerted during the rotation of the idler 1, 2, 3 will seal up this passage, and especially the narrow slot adjacent the outer edge of washer 22. Thus, water as well as solid particles which might have penetrated through the narrow slot between hub 21 and cover 24 are blocked by such grease seal from penetrating any further toward the inside of the sealing structure. Furthermore, the outwardly directed conical shape of gasket 19 exerts a sealing pressure upon ring 15, any pressure from the outside thus tending to press the gasket more effectively against the ring 19 to thereby increase the sealing action.

Figures 2, 3:
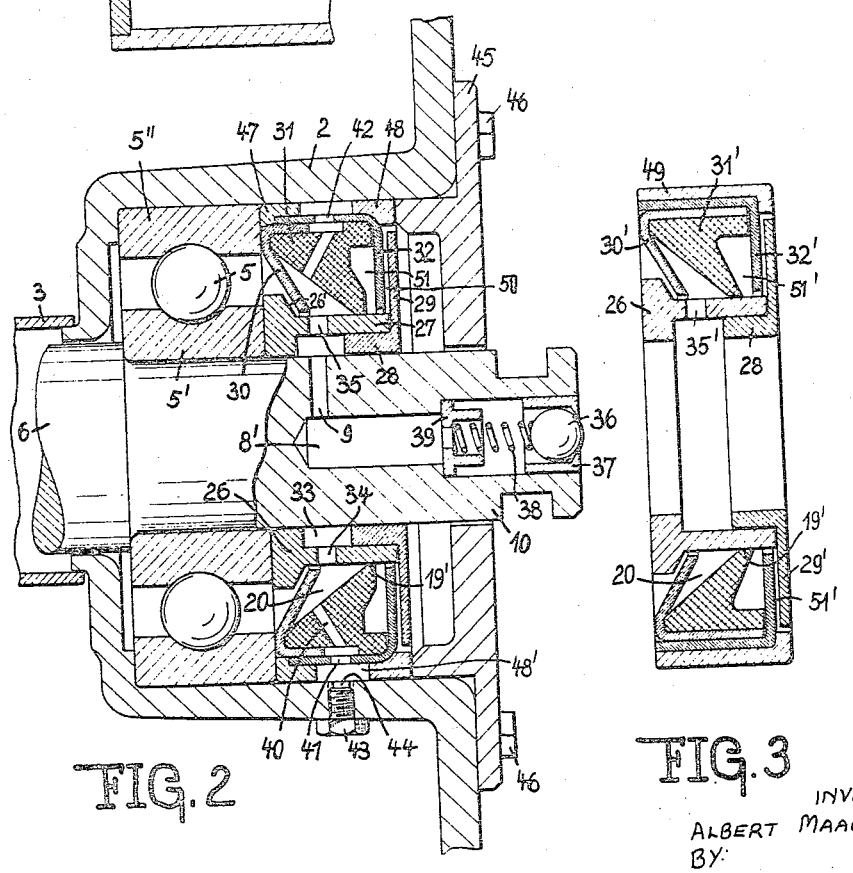

Thus, as seen in the drawing, any foreign matter of a coarser nature will be prevented by the outer cover 24 from entering the sealing structure, whereas the finer solid or liquid particles which might be able to penetrate through the narrow annular slot between the outer cover and the hub 21 will be further warded off by, or caught in, the labyrinthlike passage around the washer 22, the most persistent particles finally being stopped completely by the resilient seal 19 pressing tightly against the ring 15. The embodiment of the invention shown in Fig. 2 is substantially similar to that shown in Fig. 1. However, in place of the ring 15 of the first embodiment, a ring 26 is provided therein, the cylindrical part 27 of which is slid over the hub 28 of a disk or washer 29. The washer 30 corresponding to washer 18 in Fig. 1 is shaped so as partly to encompass the resilient sealing gasket 31 and to form together with ring 26, and especially the conical shoulder 26′ thereof, a narrow channel for the passage of a small amount of grease to bearing 5. The conical shape of washer 30, similarly as in Fig. 1, also assures that, when grease is injected, it will first slide outwardly along the conical surface of the washer to fill up chamber 20 completely before it will ooze through the narrow channel intermediate washer 30 and ring 20 into the bearing 5. Also, such conical shape acts as a reinforcement to prevent the rotating washer 30 from being forced into sliding contact with the stationary shoulder 26′ which would close the narrow passage of grease into the bearing 5 entirely, especially when chamber 20 is under pressure.

Washer 30 fits into another washer 32 of potlike shape, both washers 30 and 32 thus cooperating to surround the gasket 31 entirely on three sides, except for the narrow annular slots between the inner edge of each washer 30 and 32 and the ring 26 for the passage of grease, on the one hand, to bearing 5 and, on the other hand, to the labyrinthlike seal as subsequently described. A pair of spaced rings 47 and 48 are fitted into the inner wall of socket 2 and are suitably shaped so as to form a mounting for the washers 30 and 32 and to leave an intermediate groove 48′ for admission of grease.

Ring 26 is also provided with an annular groove 33 and two or more radial apertures 34 and 35. The reduced neck portion 10 of shaft 6 has a central socketlike bore 8′ with a radial bore 9 extending outwardly and communicating with the annular groove 33. The outer end of bore 8′ at each end of shaft 6 is closed by a check valve consisting of a ball 36 guided in a socket 37 and forced outwardly by a spring 38 held in a socket 39 to close the mouth of socket 37. The bearing seal of the embodiment shown in Fig. 2 as well as the bearing 5 itself may be supplied with grease either in a similar manner as the corresponding elements shown in Fig. 1, that is, through the bore 8′, or directly through the wall of the outer socket 2. For this purpose, the gasket 31 which is otherwise of a shape substantially similar to gasket 19 in Fig. 1, is provided with one or more transverse bores 40, which are in line with similar bores 41, 42 in the potlike washer 32. After unscrewing a plug 43 in the wall of the outer socket 2 with a suitable socket wrench inserted through an aperture in the belt-supporting cylinder 1, grease may be supplied through the bore 44 into the groove 48′ intermediate the rings 47 and 48 and thence through the bores 41, 42 and the bores 40 in the gasket 31 into the chamber 20 of angular cross section.

Another, and preferred embodiment of the invention is illustrated in Fig. 3, wherein the entire sealing means are combined in a single unit which, after the bearing 5 has been inserted into the socket 2, may be slid over the reduced end 10 of the shaft 6 and into the socket 2 until it abuts against the bearing 5. Thereafter it is only necessary to fit the cover 45 over the end of the shaft and into the mouth of the socket 2, and to screw in and tighten the bolts 46. The sealing unit shown in Fig. 3 is very similar to the assembly shown in Fig. 2. However, the two rings 47 and 48 of Fig. 2 are replaced by a single outer ring 49 within which are fitted the telescoped washers 30' and 32', the resilient gasket 31' within, and enclosed on both sides by the washers 30' and 32', and the two inner rings 26 and 28. The central aperture in the washer 30' again has a diameter slightly larger than the outer diameter of ring 26' so as to provide a narrow annular slot through which a small amount of grease may pass to the bearing 5. Obviously, if desired, the bearing unit shown in Fig. 3 may also be provided with transverse apertures through the outer ring 49, the washers 30' and 32' and the gasket 31' similarly as shown in Fig. 2, so that the grease may be supplied through a bore 44 in the socket 2 rather than through the bore 35'.

In operation, assuming that the roller bearings 5 have been properly greased before being fitted into the socket housing 2 and that they are to be newly greased, the grease may be added either through the bore 8' or the bore 44. The grease injected under pressure into chamber 20 then acts upon the resilient gasket 31 or 31', respectively, so that the annular sealing surface 19' thereof, which presses upon the cylindrical part of the ring 26 respectively, is lifted therefrom sufficiently to permit the grease to penetrate into the chamber 51 or 51', respectively, and, after filling this chamber, to pass through the narrow slots 50 or passages between the washers 32, 29, and 45 in Fig. 2, or 32', 29' in Fig. 3, until it emerges through the narrow slot at the outer end of the shaft 6 between the shaft and the cover plate 45. The bearing is then sealed effectively. Since in operation the centrifugal force will force the grease outwardly, it will absolutely prevent any water from entering into the grease-filled passages, provided new grease be added at regular intervals through the bores 8, 8' or 44, respectively.

In some cases it may be necessary not only to use the sealing means according to the invention to protect the bearings from the entry of any dust, or liquids, especially water during the normal operation of the conveyor or other machine in which the bearing is used, but also to prevent the possible entry therein of dust or fine sand while new grease is being added. Thus, for example, such solid particles may have accumulated on the grease nipple and may then be forced into the bearing by the very action of pumping new grease therein, or the surrounding air may be so heavily contaminated that during the time between the removal of the grease plug, such as the plug 11 in Fig. 1 or the plug 40 in Fig. 2, and the application of the grease gun, dust or sand particles may enter the opening and then be forced with the new grease into the bearing.

In such event the sealing structure may be easily modified by making the inner or aperture diameter of the conical washer 18, 30, or 30', respectively, so small that it will almost touch, or even slide upon the cylindrical surface of the ring 15 or 26, respectively. Thus, the space or passage through which the grease may reach the bearing is exceedingly small so that hardly any grease can enter the bearing, the latter being adequately lubricated at the factory for the natural life of the machinery so as not to require any subsequent lubrication as long as there is no possibility that any foreign matter may enter it. In such event, the addition of new grease will be merely for the purpose of flushing out the old, contamined sealing grease and for supplying a new clean oil seal.

While the invention has been described in detail with respect to certain new preferred examples and embodiments of the invention, it will be understood by those skilled in the art that various changes and modifications may be made without departing from the spirit and scope of the invention as defined in the appended claims. Thus, for example, the relative position of the respective elements may be reversed so that the outer parts will constitute a stationary support for a rotatable shaft, or that these outer parts and the shaft may rotate in opposite directions. Thus, the invention is not intended to be restricted to idlers or the like but may be applied to any apparatus or machinery wherein a bearing of any kind should be sealed from being contaminated either from the outside or from any adjacent machinery.

Having thus described my invention, what I claim as new is:

1. A combined lubricant-sealing and lubricant-delivering arrangement for use in a bearing structure having a shaft, an outer element around said shaft having at least one open end, and a bearing intermediate said shaft and said outer element for rotatably mounting said shaft and outer element relative to each other, comprising, in combination, a resilient annular gasket mounted within said outer element in front of said bearing and having a central portion with substantially conical outer and inner walls converging toward said open end, the inner edge of said central portion encircling, and resiliently pressing upon said shaft; annular members mounted on and radially projecting from said shaft and said outer element, respectively, at least one of said annular members projecting outwardly from said shaft and having an outer diameter slightly smaller than the inner diameter of said outer element, and at least one other of said annular members projecting inwardly from said outer element toward said shaft and having an inner diameter slightly larger than the outer diameter of said shaft, said annular members being in a spaced relation to each other so as to form an intermediate narrow labyrinthlike passage leading from the outer conical wall of said gasket toward the open end of said outer element, the inner conical wall of said gasket together with the front side wall of said bearing and the intermediate portion of said shaft forming an annular chamber; and means forming a passage for injecting a combined lubricant and lubricant-sealing substance under pressure directly into said chamber, the inner edge of said central conical portion adapted to be forced by said compressed substance away from said shaft so as to permit said substance to pass from said chamber into said labyrinth passage to fill the same and to seal said passage toward the outside, thereby sealing said open end of said outer element.

2. A combined lubricant-sealing and lubricant-delivering arrangement for use in a bearing structure having a shaft, an outer element around said shaft having at least one open end, and a bearing intermediate said shaft and said outer element for rotatably mounting said shaft and outer element relative to each other, comprising, in combination, a resilient annular gasket mounted within said outer element in front of said bearing and having a central portion with substantially conical outer and inner walls converging toward said open end, the inner edge of said central portion encircling, and resiliently pressing upon said shaft; annular members mounted on and radially projecting from said shaft and said outer element, respectively, at least one of said annular members projecting outwardly from said shaft and having an outer diameter slightly smaller than the inner diameter of said outer element, and at least one other of said annular members projecting inwardly from said outer element toward said shaft and having an inner diameter slightly larger than the outer diameter of said shaft, said annular members being in a spaced relation to each other so as to form an intermediate narrow labyrinthlike passage leading from the outer conical wall of said gasket toward the open end of said outer element; an annular metallic member intermediate said bearing and said gasket and around said shaft and having an inner diameter only slightly larger than the outer diameter of said shaft for substantially sealing said bearing, the inner conical wall of said gasket together with the front wall of said metallic member and the intermediate portion of said shaft forming an annular chamber; and means forming a passage for injecting a combined lubricant and lubricant-sealing substance under pressure into said chamber, the inner edge of said central conical portion adapted to be forced by said compressed substance away from said shaft so as to permit said substance to pass from said chamber into said labyrinth passage to fill the same and to seal said passage toward the outside, thereby sealing said open end of said outer element.

3. A combined lubricant-sealing and lubricant-delivering arrangement for use in a bearing structure having a shaft, an outer element around said shaft having at least one open end, and a bearing intermediate said shaft and said outer element for rotatably mounting said shaft and outer element relative to each other, comprising, in combination, a resilient annular gasket mounted within said outer element in front of said bearing and having a central portion with substantially conical outer and inner walls converging toward said open end, the inner edge of said central portion encircling, and resiliently pressing upon said shaft; annular members mounted on and radially projecting from said shaft and said outer element, respectively, at least one of said annular members projecting outwardly from said shaft and having an outer diameter slightly smaller than the inner diameter of said outer element, and at least one other of said annular members projecting inwardly from said outer element toward said shaft and having an inner diameter slightly larger than the outer diameter of said shaft, said annular members being in a spaced relation to each other so as to form an intermediate narrow labyrinthlike passage leading from the outer conical wall of said gasket toward the open end of said outer element; an annular metallic member intermediate said bearing and said gasket and having a central conical portion converging toward said gasket and with an inner diameter slightly larger than the outer diameter of said shaft so as to form a narrow intermediate passage, the inner conical wall of said gasket together with the conical portion of said metallic member and the intermediate portion of said shaft forming an annular chamber; and means forming a passage for injecting a combined lubricant and lubricant-sealing substances under pressure into said chamber, and after filling said chamber for forcing a small quantity of said substance through said first passage into said bearing, and for simultaneously forcing the inner edge of said central conical portion of said gasket away from said shaft so as to permit said substance to pass from said chamber into said labyrinth passage to fill the same and to seal said passage toward the outside, thereby sealing said open end of said outer element.

4. A combined lubricant-sealing and lubricant-delivering arrangement for use in a bearing structure having a shaft, an outer element around said shaft having at least one open end, and a bearing intermediate said shaft and said outer element for rotatably mounting said shaft and outer element relative to each other, comprising, in combination, a resilient annular gasket mounted within said outer element in front of said bearing and having a central portion with substantially conical outer and inner walls converging toward said open end, the inner edge of said central portion encircling, and resiliently pressing upon said shaft; annular members mounted on and radially projecting from said shaft and said outer element, respectively, at least one of said annular members projecting outwardly from said shaft and having an outer diameter slightly smaller than the inner diameter of said outer element, and at least one other of said annular members projecting inwardly from said outer element toward said shaft and having an inner diameter slightly larger than the outer diameter of said shaft, said annular members being in a spaced relation to each other so as to form an intermediate narrow labyrinthlike passage leading from the outer conical wall of said gasket toward the open end of said outer element; an annular metallic member intermediate said bearing and said gasket and around said shaft and having an inner diameter only slightly larger than the outer diameter of said shaft for substantially sealing said bearing, the inner conical wall of said gasket together with the front wall of said metallic member and the intermediate portion of said shaft forming an annular chamber; means forming a passage within said shaft and communicating with said chamber for injecting a combined lubricant and lubricant-sealing substances under pressure into said chamber, the cross sectional area of said central portion of said gasket gradually decreasing toward said inner edge thereof, said inner edge adapted to be forced by said compressed substance in said chamber away from said shaft so as to permit the substance to pass from said chamber into said labyrinth passage to fill the same and to seal said passage toward the outside, thereby sealing said open end of said outer element; and means for closing said passage within said shaft toward the outside.

5. A combined lubricant-sealing and lubricant-delivering arrangement for use in a bearing structure having a shaft, an outer element around said shaft having at least one open end, and a bearing intermediate said shaft and said outer element for rotatably mounting said shaft and outer element relative to each other, comprising, in combination, a resilient annular gasket mounted within said outer element in front of said bearing and having a central portion with substantially conical outer and inner walls converging toward said open end, the inner edge of said central portion encircling, and resiliently pressing upon said shaft; annular members mounted on and radially projecting from said shaft and said outer element, respectively, at least one of said annular members projecting outwardly from said shaft and having an outer diameter slightly smaller than the inner diameter of said outer element, and at least one other of said annular members projecting inwardly from said outer element toward said shaft and having an inner diameter slightly larger than the outer diameter of said shaft, said annular members being in a spaced relation to each other so as to form an intermediate narrow labyrinthlike passage leading from the outer conical wall of said gasket toward the open end of said outer element, an annular metallic member intermediate said bearing and said gasket and having a central conical portion converging toward said gasket with an inner diameter slightly larger than the outer diameter of said shaft so as to form a narrow intermediate passage, the inner conical wall of said gasket together with the conical portion of said metallic member and the intermediate portion of said shaft forming an annular chamber; means forming a passage within said shaft and communicating with said chamber for injecting a combined lubricant and lubricant-sealing substances under pressure into said chamber, and after filling said chamber, for forcing a small quantity of said substances through said narrow passage into said bearing, the cross sectional area of said central portion of said gasket gradually decreasing toward said inner edge thereof, said inner edge adapted to be forced by said compressed substance in said chamber away from said shaft so as to permit the substance to pass from said chamber into said labyrinth passage to fill the same and to seal said passage toward the outside, thereby sealing said open end of said outer element; and means for closing said passage within said shaft toward the outside.

6. A combined lubricant-sealing and lubricant-delivering arrangement for use in a bearing structure having a shaft, an outer element around said shaft having at least one open end, and a bearing intermediate said shaft and said outer element for rotatably mounting said shaft and outer element relative to each other, comprising, in combination, a resilient annular gasket mounted within said outer element in front of said bearing and having a central portion with substantially conical outer and inner walls converging toward said open end, the inner edge of said central portion with substantially conical outer and inner walls converging toward said open end, the inner edge of said central portion encircling, and resiliently pressing upon said shaft; annular members mounted on and radially projecting from said shaft and said outer element, respectively, at least one of said annular members projecting outwardly from said shaft and having an outer diameter slightly smaller than the inner diameter of said outer element, and at least one other of said annular members projecting inwardly from said outer element toward said shaft and having an inner diameter slightly larger than the outer diameter of said shaft, said annular members being in a spaced relation to each other so as to form an intermediate narrow labyrinthlike passage leading from the outer conical wall of said gasket toward the open end of said outer element; an annular metallic member intermediate said bearing and said gasket and having a central conical portion converging toward said gasket with an inner diameter slightly larger than the outer diameter of said shaft so as to form a narrow intermediate passage, the inner conical wall of said gasket together with the conical portion of said metallic member and the intermediate portion of said shaft forming an annular chamber, means forming a passage within said shaft and communicating with said chamber for injecting a combined lubricant and lubricant-sealing substances under pressure into said chamber, and after filling said chamber, for forcing a small quantity of said substance through said narrow passage into said bearing, said metallic member and one of said radial members together enclosing said gasket in outward direction and on both sides, except for the narrow passages intermediate said last members and said shaft for the passage of said substance under pressure to said bearing and said labyrinth, the cross sectional area of said central portion of said gasket gradually decreasing toward said inner edge thereof, said inner edge adapted to be forced by said compressed substance in said chamber away from said shaft so as to permit the substance to pass from said chamber into said labyrinth passage to fill the same and to seal said passage toward the outside, thereby sealing said open end of said outer element; and means for closing said passage within said shaft toward the outside.

7. A combined lubricant-sealing and lubricant-delivering arrangement for use in a bearing structure having a shaft, an outer element around said shaft having at least one open end, and a bearing intermediate said shaft and said outer element for rotatably mounting said shaft and sleeve relative to each other, comprising, in combination, at least one ring-shaped member on said shaft, and in front of and abutting against said bearing, said member having an annular groove therein adjacent to said shaft and at least one radial aperture therein; a resilient annular gasket within said outer element in front of said bearing and having a central portion with substantially conical outer and inner walls converging toward said open end, the cross sectional area of said central portion gradually decreasing toward the inner edge thereof, said inner edge encircling, and resiliently pressing upon, said ring-shaped member in front of said aperture therein; annular members mounted on and radially projecting from said shaft and said outer element, respectively, at least one of said annular members projecting outwardly from said shaft and having an outer diameter slightly smaller than the inner diameter of said outer element, and at least one other of said annular members projecting inwardly from said outer element toward said shaft and having an inner diameter slightly larger than the outer diameter of said shaft, said annular members being in a spaced relation to each other so as to form an intermediate narrow labyrinthlike passage leading from the conical wall of said gasket toward the open end of said outer element; an annular metallic member intermediate said bearing and said gasket and around said ring-shaped member, and having a central conical portion converging toward said gasket with an inner diameter slightly larger than the outer diameter of said ring-shaped member so as to form a narrow intermediate passage, the inner conical wall of said gasket together with the conical portion of said metallic member and the intermediate portion of said ring-shaped member forming an annular chamber; means forming a passage within said shaft and comunicating through said annular groove within said ring-shaped member and the radial aperture therein with said chamber for injecting a lubricant under pressure into said groove and said chamber, and after filling said chamber for forcing a small quantity of combined lubricant and lubricant-sealing substances through said narrow passage into said bearing, said metallic member and one of said radial members together substantially enclosing said gasket in outward direction and on both sides, except for the narrow passages intermediate said last members and said ring-shaped member for the passage of said substance under pressure to said bearing and said labyrinth, at least one ring-shaped member mounted on the inner wall of said outer element and outwardly enclosing said metallic member and said last mentioned radial member, one of said radial members forming an outer cover for said sleeve, said inner edge of said gasket adapted to be forced by said compressed lubricant in said chamber away from the ring-shaped member on said shaft so as to permit the substance to pass from said chamber into said labyrinth passage to fill the same and to seal said passage toward the outside, thereby sealing said open end of said outer element; and means for closing said passage within said shaft toward the outside.

8. A device as defined in claim 7, wherein said gasket is further provided with at least one substantially radial bore, said outer element also having a radial bore, and a passage connecting said two radial bores so as to permit the substance to be injected through said passage to said chamber, and means for closing said radial bore in said outer element.

9. A device as defined in claim 2, wherein said gasket is further provided with at least one substantially radial bore, said outer element also having a radial bore, and a passage connecting said two radial bores so as to permit lubricant to be injected under pressure into said chamber, the cross sectional area of said central portion of said gasket gradually decreasing toward said inner edge thereof, said inner edge adapted to be forced by said compressed lubricant in said chamber away from said shaft so as to permit the substance to pass from said chamber into said labyrinth passage to fill the same and to seal said passage toward the outside, and means for closing said radial bore in said outer element.

10. A combined lubricant-sealing and lubricant-delivering arrangement for use in a bearing structure having a shaft having a bore therein leading to the periphery thereof, means for closing said bore, an outer element around said shaft having at least one open end, and a bearing intermediate said shaft and said outer element for rotatably mounting said shaft and outer element relative to each other; a unit adapted to be mounted within said outer element in front of said bearing and comprising, in combination, a double ring adapted to fit tightly upon said shaft and having an annular inner groove and a radial aperture communicating with said groove; an annular resilient gasket around said ring and having a central portion with substantially conical outer and inner walls converging toward each other and, when inserted, also toward said open end of said outer element, the inner edge of said central portion encircling and resiliently pressing upon said double ring in front of the aperture therein; a pair of cup-shaped telescoped rings enclosing said gasket on three sides, the edges of the inwardly directed walls of said pair of rings being spaced closely from the outer surface of said double ring so as to form narrow slotlike passages, the passage directed toward said bearing being narrower than the other passage, the inwardly directed wall of the ring adjacent to said bearing being bent inwardly toward said gasket, said double ring having a conical, outwardly projecting shoulder thereon, said inwardly bent wall together with said shoulder forming an intermediate annular conical passage, said inwardly bent wall, the upper surface of said double ring and the inner wall of said gasket enclosing an annular chamber of substantially triangular cross section, said chamber communicating through one of said slotlike passages and said conical passage with said bearing, said double ring having an outwardly projecting annular flange thereon, said flange being parallel with but spaced from the inwardly directed ring wall remote from said bearing so as to form a narrow intermediate passage; an outer ring peripherally enclosing all of said members of said unit and adapted to be inserted into and mounted upon the inner wall of said outer element so as to abut against said bearing, said flange projecting toward said outer ring so as to form a narrow intermediate passage; an annular cover adapted to be fitted over said shaft and to close the open end of said outer element when said unit is inserted therein; and means for locking said cover to said outer element, said cover being parallel with but spaced from said flange so as to form an intermediate passage, the inner edge of said cover being closely spaced from the peripheral surface of said shaft so as to form a narrow annular passage, all of the passages in front of said gasket thus forming a continuous labyrinthlike passage leading from said gasket toward the outside, so that when a combined lubricant and lubricant-sealing substances is injected under pressure into the bore in said shaft, and thence through the groove and aperture in said double ring into said chamber to fill up said chamber, a small quantity of said substance is then passed through the narrow conical passage into said bearing, while the substance pressure in said chamber will force the inner edge of the gasket away from said double ring to permit the substance to pass into and through said labyrinth passage, thereby flushing out any contamination therein and filling and sealing said labyrinth passage against the entry of any liquid or solid particles from the outside.

11. In an arrangement of the character described, in combination, a shaft; roller bearing means on said shaft, open on one side so as to permit the passage of a combined lubricant and lubricant-sealing substance or the like through said bearing means in a direction toward said open side thereof; sealing chamber means surrounding said shaft and arranged on the other side of said bearing means; inlet means for introducing the substance into said sealing chamber means; first flow limiting means between said sealing chamber means and said bearing means for permitting but limiting the flow of the substance under pressure from said sealing chamber into said roller bearing means so as to permit the flow of the substance into said roller bearing means without substantially increasing the pressure of the substace therein; outlet means communicating with said sealing chamber means; and second flow limiting means in said outlet means for retarding the flow therethrough of the substance from said sealing chamber means so that the substance may be maintained in said sealing chamber under pressure while a small part of the substance may pass into said bearing means, whenever needed therein, without being under substantially increased pressure therein, said second flow limiting means forming a labyrinth impeding the flow of the substance.

References Cited in the file of this patent

UNITED STATES PATENTS

| | | |
|---|---|---|
| 1,793,190 | Philips | Feb. 17, 1931 |
| 2,012,256 | Boudreau | Aug. 27, 1935 |
| 2,439,917 | Anderson | Apr. 20, 1948 |
| 2,473,513 | Dewey | June 21, 1949 |

FOREIGN PATENTS

| | | |
|---|---|---|
| 972,194 | France | Aug. 23, 1950 |
| 503,010 | Belgium | May 31, 1951 |
| 699,653 | Great Britain | Nov. 11, 1953 |